No. 683,012. Patented Sept. 17, 1901.
H. H. HILL.
OPTICAL INSTRUMENT.
(Application filed Jan. 7, 1901.)

(No Model.)

Witnesses
Alfred A. Eicks
J. W. Rippey

Inventor:
Henry H. Hill.
By Higdon & Longan Atty's

UNITED STATES PATENT OFFICE.

HENRY H. HILL, OF ST. LOUIS, MISSOURI.

OPTICAL INSTRUMENT.

SPECIFICATION forming part of Letters Patent No. 683,012, dated September 17, 1901.

Application filed January 7, 1901. Serial No. 42,420. (No model.)

*To all whom it may concern:*

Be it known that I, HENRY H. HILL, of the city of St. Louis, State of Missouri, have invented certain new and useful Improvements in Optical Instruments, of which the following is a full, clear, and exact description, reference being had to the accompanying drawings, forming a part hereof.

This invention relates to optical instruments; and it consists of the novel construction, combination, and arrangement of parts hereinafter shown, described, and claimed.

The object of this invention is to provide an improved optical instrument consisting, essentially, of a lens for enlarging the visual impression obtained by one eye and a shield for obstructing the line of vision of the other eye, thereby enabling the user to obtain a better perspective of any view than can be had by leaving a clear line of vision to both eyes. This arises from the fact that whenever the line of vision of one eye is obstructed the object can be viewed directly on parallel lines and not at an angle, as is the case when viewed with both eyes and the lines of vision converge upon a common point.

Figure 1:
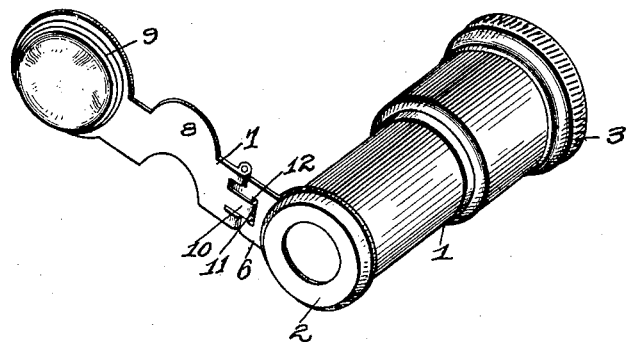
Figure 2:
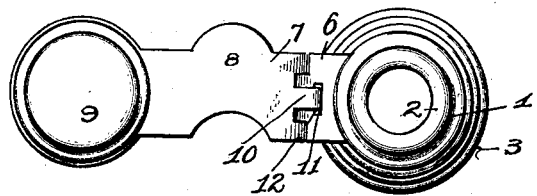
Figure 3:
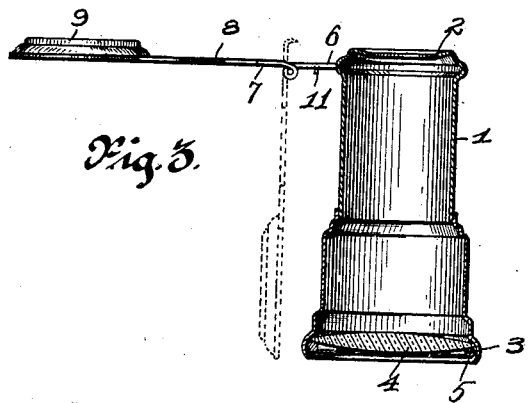
Figure 4:
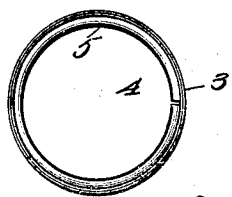

In the drawings, Figure 1 is a perspective view showing my complete invention. Fig. 2 is an end view showing the end which is applied to the eyes. Fig. 3 is a sectional view showing the manner in which the lens is retained within the tube. Fig. 4 is a view showing the outer end of the tube and the lens carried therein.

Referring to the drawings in detail, 1 denotes a tube smaller at one end than at the other, and the small end of which is adapted to be applied to the eye in using the device. The small end of the tube is provided with an internal flange 2, and the outer end is bent outwardly and inwardly, forming a rim 3. A double-convex lens 4 is carried within the outer end of the tube 1, and the edges of the said lens rest within the rim 3, in which it is retained by means of an open ring 5 applied within the said rim and which is retained therein by the expansive force of the ring. A projection 6 is rigid with the inner or small end of the tube 1 and extends laterally therefrom, and pivoted to the said projection is a metallic plate or strip 7. The said plate or strip 7 is provided with a bow 8, and on the outer end thereof is a shield 9, adapted to obstruct the line of vision of one eye when the tube 1 is applied to the other eye. The inner face of the shield 9 is concave, as shown in Fig. 1.

10 indicates a projection rigid with the inner end of the plate or strip 7, and formed on the end of the said projection is a hook 11, the same being adapted to engage within an opening 12, formed in the projection 6, and thereby hold the different parts in the position required for use.

By using my improved optical instrument a much better perspective of objects or pictures can be had than is possible under normal conditions and without the use of devices of this kind.

In use the user applies the inner end of the tube 1 to the eye and finds the focal point, the shield 9 having previously been placed to obstruct the line of vision of the other eye. The user then views the object with one eye and on parallel lines and not at an angle, which enables him to obtain a better perspective than can be had when the object is viewed at an angle.

A device constructed as described is very simple, compact, and the shield being pivoted to the tube enables the user to fold the parts together, making a very useful and convenient instrument, which can be carried in the pocket.

I claim—

1. An optical instrument, consisting of a tube, one end of which serves as an eyepiece, a lens in the outer end of the tube, a shield pivotally carried by the tube adjacent to the eyepiece and adapted to rest parallel to the tube when not in use, and a lock whereby the shield can be held at right angles to the tube to obstruct the vision of one eye, substantially as specified.

2. An optical instrument, consisting of a tube carrying a lens, a projection adjacent to one end of the tube and having an opening formed therein, a plate pivoted to said projection, a shield carried by the free end of said plate, a hook integral with the inner end of the plate and adapted to engage in the opening in the projection to hold the plate at right angles to the tube, substantially as specified.

In testimony whereof I affix my signature in presence of two witnesses.

HENRY H. HILL.

Witnesses:
ALFRED A. EICKS,
J. D. RIPPEY.